(12) United States Patent
Smith et al.

(10) Patent No.: US 12,086,530 B1
(45) Date of Patent: Sep. 10, 2024

(54) APPARATUS AND A METHOD FOR THE GENERATION OF A COLLABORATION SCORE

(71) Applicant: The Strategic Coach Inc., Toronto (CA)

(72) Inventors: Barbara Sue Smith, Toronto (CA); Daniel J. Sullivan, Toronto (CA)

(*) Notice: Subject to any disclaimer, the term of this patent is extended or adjusted under 35 U.S.C. 154(b) by 0 days.

(21) Appl. No.: 18/399,304

(22) Filed: Dec. 28, 2023

(51) Int. Cl.
| | | |
|---|---|---|
| *G06F 17/00* | (2019.01) | |
| *G06F 40/10* | (2020.01) | |
| *G06Q 10/101* | (2023.01) | |
| G06Q 10/0631 | (2023.01) | |
| G06Q 10/10 | (2023.01) | |

(52) U.S. Cl.
CPC ........... *G06F 40/10* (2020.01); *G06Q 10/101* (2013.01); *G06Q 10/0631* (2013.01); *G06Q 10/103* (2013.01)

(58) Field of Classification Search
CPC .......... G06N 20/00; G06N 5/04; G06N 5/042; G06F 16/9535; G06F 16/24578; G06F 40/10; G06F 16/93; G06F 40/295; G06F 16/35; G06F 16/367; G06F 16/355; G06F 40/279; G06F 16/288; G06F 16/435; G06F 21/629; G06F 9/5027; G06F 16/635; G06F 16/9035; G06F 18/24; G06F 18/25; G06F 16/337; G06F 18/23; G06F 18/22; G06F 16/735; G06F 16/2468; G06F 16/906; G06F 3/1239; G06F 16/2457; G06F 16/437; G06F 18/2431; G06F 18/29; G06F 8/34; G06F 16/75; G06F 16/638; G06F 16/538; G06F 16/9038; G06F 18/26; G06Q 10/06; G06Q 10/10; G06Q 10/0631; G06Q 10/06311; G06Q 10/101; G06Q 10/06313; G06Q 10/103; G06Q 10/067; G06Q 10/063118
See application file for complete search history.

(56) References Cited

U.S. PATENT DOCUMENTS

| | | | |
|---|---|---|---|
| 7,996,441 B2 * | 8/2011 | Johnson | G06Q 40/04 |
| | | | 707/804 |
| 11,556,754 B1 * | 1/2023 | Ramanarayanan | G06F 16/22 |
| 11,863,676 B1 * | 1/2024 | Richter | H04L 9/3297 |
| 2014/0180943 A1 | 6/2014 | Priddy | |
| 2019/0034520 A1 * | 1/2019 | Jalagam | G06F 16/27 |

(Continued)

*Primary Examiner* — Michael Ortiz-Sanchez
(74) *Attorney, Agent, or Firm* — Caldwell Intellectual Property Law

(57) ABSTRACT

An apparatus for the generation of a collaboration score is disclosed. The apparatus includes at least a processor and a memory communicatively connected to the at least a processor. The memory instructs the processor to receive a plurality of entity profiles from a plurality of entities, wherein each of the plurality of entity profiles includes entity data. The memory instructs the processor to identify a plurality of opportunity data as a function of the plurality of entity profiles. The memory instructs the processor to generate collaboration data as a function of the plurality of opportunity data. The memory instructs the processor to determine a collaboration score as a function of the collaboration data. The memory instructs the processor to draft a collaboration report as a function of the collaboration score and the collaboration data. The memory instructs the processor to display the collaboration report using a display device.

20 Claims, 10 Drawing Sheets

(56) References Cited

U.S. PATENT DOCUMENTS

| | | | |
|---|---|---|---|
| 2019/0197478 A1* | 6/2019 | Ferreira Moreno | ........................ G06Q 10/06311 |
| 2021/0026897 A1* | 1/2021 | Rathje | ............... G06F 16/90332 |
| 2021/0383261 A1* | 12/2021 | Hanna | .................. G06Q 10/105 |
| 2022/0138651 A1* | 5/2022 | Ramaswamy | ......... G06Q 50/01 705/7.13 |
| 2022/0263877 A1* | 8/2022 | Conlin | .................. H04L 65/765 |
| 2022/0292459 A1 | 9/2022 | Sabharwal | |

* cited by examiner

APPARATUS AND A METHOD FOR THE GENERATION OF A COLLABORATION SCORE

FIELD OF THE INVENTION

The present invention generally relates to the field of artificial intelligence. In particular, the present invention is directed to an apparatus and a method for the generation of a collaboration score.

BACKGROUND

Automated evaluation and scoring a collaboration between multiple entities is becoming increasingly important and difficult. Accurately pairing two or more entities based on empirical data using a computing process has been an inexact and inaccurate process due to numerous variables and inaccurate pairing. Current attempts at automating this process have failed in accurately pairing entities based on their needs.

SUMMARY OF THE DISCLOSURE

In an aspect, an apparatus for the generation of a collaboration score is disclosed. The apparatus includes at least a processor and a memory communicatively connected to the at least a processor. The memory instructs the processor to receive a plurality of entity profiles from a plurality of entities, wherein each of the plurality of entity profiles includes entity data. The memory instructs the processor to identify a plurality of opportunity data as a function of the plurality of entity profiles. Generating opportunity data additionally includes classifying the entity data into a plurality of opportunity categories; determining an attribute score as a function of the classification the plurality of entity profiles; plotting a plurality graphical data as a function of the attribute score, wherein a plurality of graphical data comprises a first graphical datum associated with the first entity profile and a second graphical datum associated with the second entity profile; and identifying the plurality of opportunity data as a function of a comparison of the first graphical datum and the second graphical datum. The memory instructs the processor to generate collaboration data as a function of the plurality of opportunity data. The memory instructs the processor to determine a collaboration score as a function of the collaboration data. The memory instructs the processor to draft a collaboration report as a function of the collaboration score and the collaboration data. The memory instructs the processor to display the collaboration report using a display device.

In another aspect, a method for the generation of a collaboration score is disclosed. The method includes receiving, using at least a processor, a plurality of entity profiles from a plurality of entities, wherein each of the plurality of entity profiles includes entity data. The method includes identifying, using the at least a processor, a plurality of opportunity data as a function of the plurality of entity profiles. Generating opportunity data additionally includes classifying the entity data into a plurality of opportunity categories; determining an attribute score as a function of the classification the plurality of entity profiles; plotting a plurality graphical data as a function of the attribute score, wherein a plurality of graphical data comprises a first graphical datum associated with the first entity profile and a second graphical datum associated with the second entity profile; and identifying the plurality of opportunity data as a function of a comparison of the first graphical datum and the second graphical datum. The method includes generating, using the at least a processor, collaboration data as a function of the plurality of opportunity data. The method includes determining, using the at least a processor, a collaboration score as a function of the collaboration data. The method includes drafting, using the at least a processor, a collaboration report as a function of the collaboration score and the collaboration data. The method includes displaying the collaboration report using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of a collaboration score is disclosed. The apparatus includes at least a processor and a memory communicatively connected to the at least a processor. The memory instructs the processor to receive a plurality of entity profiles from a plurality of entities, wherein each of the plurality of entity profiles includes entity data. The memory instructs the processor to identify a plurality of opportunity data as a function of the plurality of entity profiles. The memory instructs the processor to generate collaboration data as a function of the plurality of opportunity data. The memory instructs the processor to determine a collaboration score as a function of the collaboration data. The memory instructs the processor to draft a collaboration report as a function of the collaboration score and the collaboration data. The memory instructs the processor to display the collaboration report using a display device. Exemplary embodiments illustrating aspects of the present disclosure are described below in the context of several specific examples.

Figure 1:
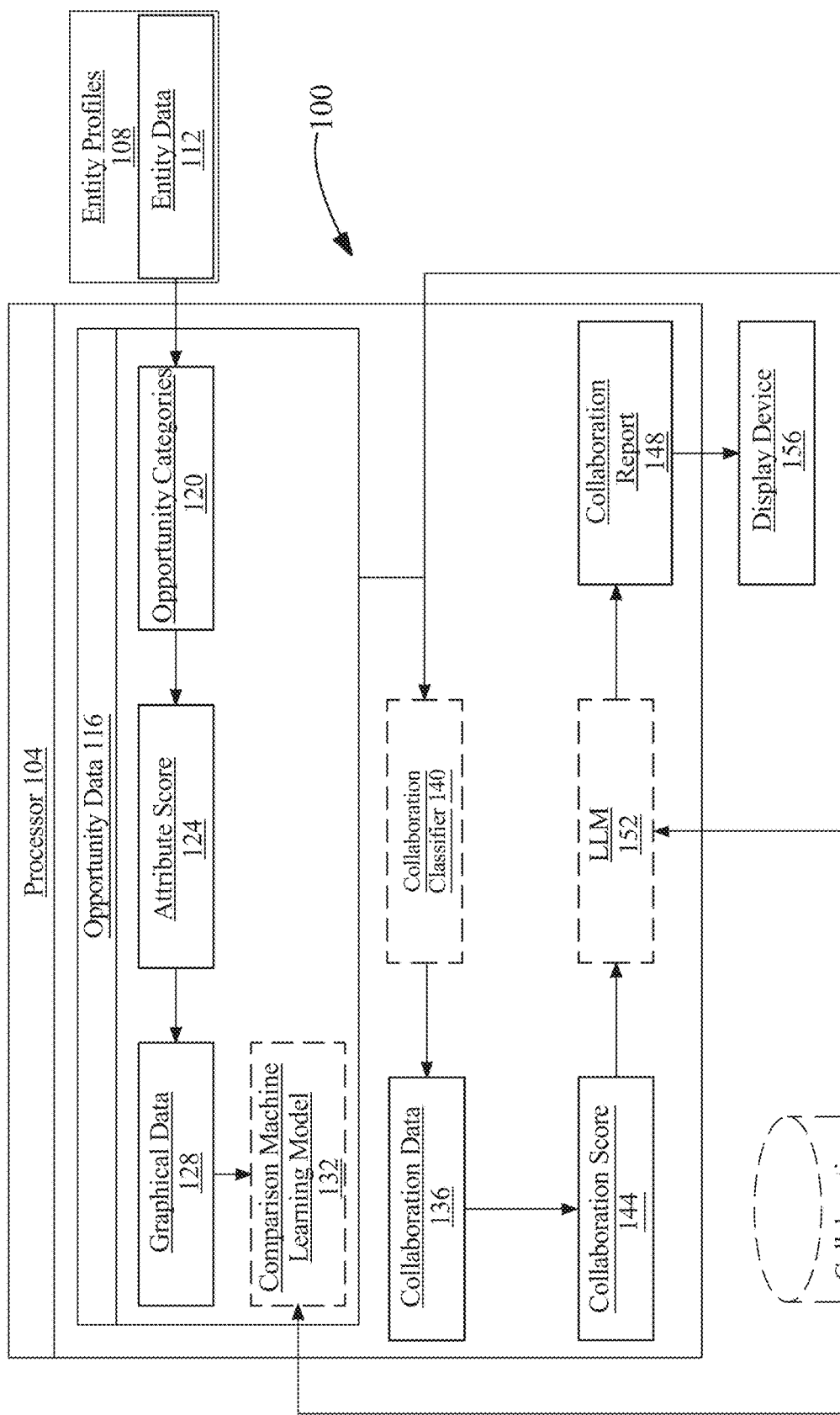
FIG. 1 is a block diagram of an exemplary embodiment of an apparatus for the generation of a collaboration score.

Referring now to FIG. 1, an exemplary embodiment of apparatus 100 for the generation of a collaboration score is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to receive a plurality of entity profiles 108 from a plurality of entities. For the purposes of this disclosure, an "entity profile" is a data structure representing an entity. An entity profile 108 may be made up of a plurality of entity data 112. As used in the current disclosure, "entity data" is information associated with the entity. As used in the current disclosure, an "entity" is an organization including of one or more persons with a specific purpose. An entity may include a corporation, organization, business, group, and the like. An entity profile 108 may be created by a processor 104, a user, or a third party. As used in the current disclosure, a "user" is an authoritative figure within the entity. The user may include a manager, owner, or shareholder of the entity. The entity data 112 may include information regarding the entity's revenue, gross income, net income, business debts, a list of business expenses, current inventory, inventory history, sales information, human resource information, employee information, employee salaries, time cards, a list of company assets, a list of capital projects, accounting information, clientele, relationship status, business associates, profession, experience, finances, geographic location, and the like. A plurality of entity profiles 108 may include a first entity profile and a second entity profile, wherein the first entity profile and the second entity profile are both entity profiles 108 as defined herein above. The first entity profile may be associated with a first entity, whereas the second entity profile may be associated with a second entity.

With continued reference to FIG. 1, an entity profile 108 may include entity records. As used in the current disclosure, an "entity record" is a document that contains information regarding the entity. Entity records may include employee credentials, reports, financial records, medical records, business records, Asset inventory, sales history, sales predictions, and government records (i.e. birth certificates, social security cards, and the like). An entity record may additionally include an employee record. An employee record may include things like employee evaluations, human resource records, client files, invoices, timecards, driver's license databases, news articles, social media profiles and/or posts, and the like. Entity records may be identified using a web crawler. Entity records may include a variety of types of "notes" entered over time by the user, employees of the user, support staff, advisors, and the like. In some embodiments, processor 104 may be configured to convert entity records into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the entity profile 108 and entity data 112. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past entity profiles 108, sales records, user notes, and observations, based on criteria such as a time, location, and the like.

With continued reference to FIG. 1, a processor 104 generates a plurality of opportunity data 116 as a function of the plurality of entity profiles 108. As used in the current disclosure, "opportunity data" is an element of data describing an opportunity for collaboration between two or more entities based on one or more traits of the entity. Opportunity data 116 may include data regarding an opportunity for two or more entities to share, trade, and/or exchange resources in a manner that is mutually beneficial to all entities. An entity's traits may include an entity's size, product quality, infrastructure, sales information, goods, or services provided, confidence, creativity, credibility, connections, capability, and the like. Each one of these entity traits may be classified as an asset or a liability using a classifier or a machine learning model as described herein.

With continued reference to FIG. 1, identifying a plurality of opportunity data 116 includes classifying entity data 112 into a plurality of opportunity categories 120. As used in the current disclosure, an "opportunity category" is an associative group of opportunities for an entity. Opportunity categories 120 may include categories such as personnel, infrastructure, resources, equipment, clientele, financial obligations, finances, office space, buildings, structures, expertise, and the like. In an embodiment, a processor 104 may be configured to generate a plurality of opportunity categories 120 based on the available entity profiles 108. Processor 104 may generate a plurality of opportunity categories 120 based on historical versions of the opportunity categories. Processor 104 may generate a plurality of opportunity categories 120 by extracting relevant features, characteristics, or traits associated with each entity profile 108 of the plurality of entity profiles. Identification of features may depend on the nature of the entity and the strengths and weaknesses of that entity. In other embodiments, a processor 104 be configured to receive a plurality of opportunity categories 120 from a database such as database 300. Processor 104 may further classify entity data 112 within the categories as assets or liabilities. In a non-limiting example, the assets/liabilities of an entity may include the quality of the brand's image/reputation, quality of products/services, quality of customer service, location, technology, customer base, and the like. Opportunity data 116 may describe areas where an entity is thriving. Conversely, opportunity data 116 may also describe areas where an entity needs help. In a non-limiting example, opportunity data 116 may describe how an entity has accumulated a significant amount of debt over the last six months due to a lack of clientele and a surplus of employees. The liabilities of the entity may include the lack of clientele and a lack of personnel management, while the assets of the entity may be described as a plethora of skilled personnel and infrastructure. Processor 104 may identify by comparing the current entity to previous examples of entities. Processor 104 may receive historical examples of entity profile 108 and their corresponding opportunity data 116 from a database such as database 300. Processor 104 may compare the current entity profile 108 to the previous entity profile 108 and their corresponding opportunity data 116. Entity profile 108 may be compared by size, revenue, business goals, and the like. Processor 104 may use the previous assets and liabilities of past entities to classify elements of entity data 112 of the current entity profile 108 as assets/liabilities. Each opportunity datum 116 may represent an entity profile 108. For instance, a first opportunity datum may be representative of a first entity profile, while a second opportunity datum may be representative of a second entity profile, and up to an nth opportunity datum may be representative of an nth entity profile.

With continued reference to FIG. 1, identifying a plurality of opportunity data 116 includes determining an attribute score 124 as a function of the classification of the plurality of entity profiles into opportunity categories 120. As used in the current disclosure, an "attribute score" is a score that describes the degree to which an attribute is an asset or a liability to the entity. A processor 104 may generate an attribute score 124 for each attribute of each entity. An attribute score 124 may be used to normalize entity data 112 and/or opportunity data 116 to bring all attributes onto a comparable scale. This step is important to eliminate any bias introduced by different units or measurement scales. Normalization techniques can include min-max scaling, z-score normalization, or logarithmic transformation. In an embodiment, if an entity possesses a particularly strong attribute the attribute score 124 may be high, conversely if it if an entity possesses a particularly weak attribute the attribute score 124 may be low. An attribute score 124 may be expressed as a numerical score, a linguistic value, or an alphabetical score. Attribute score 124 may be represented as a score used to reflect the degree to which an attribute is an asset or a liability. A non-limiting example, of a numerical score, may include a scale from 1-10, 1-100, 1-1000, and the like, wherein a rating of 1 may represent an unfavorable attribute of the entity, whereas a rating of 10 may represent a highly favorable attribute of the entity. Additionally, on a scale from 1-100 a score of 50 may represent an attribute that is neither an asset nor a liability to the entity, whereas a rating of 15 may represent a significant liability to the entity and a rating of 94 may represent a significant strength of the entity. In another non-limiting example, linguistic values may include, "Strong Asset," "Moderate Asset," "Neutral Attribute," "Moderate Liability," "Strong Liability," and the like. In some embodiments, linguistic values may correspond to a linguistic variable score range. For example, an attribute that receives a score between 40-60, on a scale from 1-100, may be considered a "Neutral Attribute."

With continued reference to FIG. 1, the attribute score 124 for each attribute may be generated based on one or more attribute quantifiers. As used in the current disclosure, an "attribute quantifier" is a quantifier used to give a category associated with a given attribute weight. These categories may include one or more opportunity categories 120. An attribute quantifier may be used to assign weights or importance values to each opportunity category and the attributes associated with those categories. based on their statistical significance and impact on entity performance. This can be done using statistical models, domain expertise, or machine learning algorithms. The weights should reflect the relative contribution of each attribute to the overall entity's success. Processor 104 may generate an attribute quantifier based on entity data 112. Specifically, this may include the size of the entity, types of goods and services provided, quality of goods and services provided, target demographics, and the like. A processor may generate an attribute quantifier based on historical attribute quantifiers for entities of similar size, industry, and status. Processor 104 may additionally apply analytical statistical techniques to analyze the data and assess the relationship between each attribute and the overall entity performance. Techniques such as correlation analysis, regression analysis, or machine learning algorithms may be used to help identify the attributes that have a significant impact on business outcomes.

With continued reference to FIG. 1, processor 104 may generate the attribute score 124 using an attribute score machine-learning model. As used in the current disclosure, an "attribute score machine-learning model" is a machine-learning model that is configured to generate an attribute score 124. The attribute score machine-learning model may be consistent with the machine-learning model described below in FIG. 2. Inputs to the attribute score machine-learning model may include entity profile 108, entity data 112, opportunity data 116, opportunity categories 120, attribute qualifiers, examples of attribute scores 124, and the like. Outputs to the attribute score machine-learning model may include an attribute score 124 tailored to one or more attributes of the entity. Attribute score training data is a plurality of data entries containing a plurality of inputs that are correlated to a plurality of outputs for training a processor by a machine-learning process. In an embodiment, attribute score training data may include a plurality of opportunity data 116 correlated to examples of attribute scores. Attribute score training data may be received from database 300. Attribute score training data may contain information regarding entity profile 108, entity data 112, opportunity data 116, opportunity categories 120, attribute qualifiers, examples of attribute scores, and the like. In an embodiment, an attribute score machine-learning model may be iteratively updated with the input and output results of past attribute score machine-learning models. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, With continued reference to FIG. 1, processor 104 may generate opportunity data 116 using an opportunity classifier. As used in the current disclosure, an "opportunity classifier" is a classifier that is configured to generate opportunity data 116. The opportunity classifier may be consistent with the classifier or machine learning model described below in FIG. 2. Inputs to the opportunity classifier may include entity profile 108, entity data 112, opportunity categories 120, attribute score 124, attribute quantifier, examples of opportunity data 116, and the like. Outputs to the opportunity classifier may include opportunity data 116. In an embodiment, an opportunity classifier may be configured to classify a plurality of entity data 112 into a plurality of opportunity categories. Additionally, the opportunity classifiers may be configured to classify the plurality of entity data 112 as either an asset or a liability. Opportunity training data may include a plurality of data entries containing a plurality of inputs that are correlated to a plurality of outputs for training a processor by a machine-learning process. Opportunity training may include a plurality of entity data 112 correlated to examples of opportunity data 116. Opportunity training data may be received from database 300. Opportunity training data may contain information about entity profile 108, entity data 112, opportunity categories 120, attribute score 124, attribute quantifier, examples of opportunity data 116, and the like. In an embodiment, an opportunity classifier may be iteratively updated with the input and output results of past opportunity classifiers. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a machine-learning model, such as an opportunity classifier, may be implemented as a fuzzy inferencing system. As used in the current disclosure, a "fuzzy inference" is a method that interprets the values in the input vector (i.e., entity data 112 and examples of opportunity data 116.) and, based on a set of rules, assigns values to the output vector. A set of fuzzy rules may include a collection of linguistic variables that describe how the system should make a decision regarding classifying an input or controlling an output. An example of linguistic variables may include variables that represent one or more opportunity data 116. Examples of linguistic variables may include terms such as "Assets" and "Liabilities." Entity data 112 and examples of opportunity data 116 may each individually represent a fuzzy set. The opportunity data 116 may be determined by a comparison of the degree of match between a first fuzzy set and a second fuzzy set, and/or single values therein with each other or with either set, which is sufficient for purposes of the matching process.

Still referring to FIG. 1, opportunity data 116 may be determined as a function of the intersection between two fuzzy sets. Ranking the opportunity data 116 may include utilizing a fuzzy set inference system as described herein below, or any scoring methods as described throughout this disclosure. For example, without limitation, processor 104 may use a fuzzy logic model to determine an opportunity data 116 as a function of fuzzy set comparison techniques as described in this disclosure. In some embodiments, each piece of information associated with a plurality of entity data 112 may be compared to a plurality of examples of opportunity data 116, wherein the opportunity data 116 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a plurality of entity data 112 to a plurality of opportunity data 116 to determine the opportunity data 116 specifics to the entity profile 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

With continued reference to FIG. 1, a processor 104 may be configured to identify a plurality of opportunity data 116 as a function of plotting a plurality graphical data 128 as a function of the attribute score 124. As used in the current disclosure, "graphical data" is a visual representation of information or data points that convey various attributes of an entity. Graphical data 128 may refer to any type of data that is presented visually through graphical representations, such as charts, graphs, diagrams, maps, and other visual aids. These visual representations may represent complex data and are used to communicate information in a way that is easier to comprehend. Graphical data 128 can come in many forms, depending on the type of data being presented and the intended audience. For example, a line graph may be used to show the trend of a particular data set over time, while a pie chart may be used to display the distribution of different categories within a larger data set. Other types of graphical data 128 may include bar charts, scatter plots, heat maps, network diagrams, and the like. Graphical data 128 may include a graphical representation of one or more elements of opportunity data 116 or an attribute score 124. This graphical representation may include one or more attribute scores 124 plotted as a single point or a plurality of points representing two or more attribute scores 124 over time. This may include a graphical representation of any of the characteristics and attributes of the entity represented above, wherein these attributes may be quantitative or qualitative in nature. In some embodiments, graphical data 128 may include plotting an attribute score 124 along a continuum. As used in the current disclosure, a "continuum" is a spectrum or a range of values, qualities, or attributes that exist along a single dimension or scale. A continuum may represent a continuous progression from one extreme to another, without any clear-cut boundaries or discrete categories. In a continuum, there are no distinct breakpoints or divisions, but instead, there is a gradual transition or progression from one end to the other. In some embodiments, a continuum may represent qualitative traits that exist on a spectrum. In a non-limiting example, a continuum may represent the degree to which a characteristic or a trait of an entity is an asset or a liability as represented by one or more attribute scores 124. Graphical data 128 may include a plurality of continuums, wherein each continuum represents one more trait or characteristic of an entity. In some embodiments, multiple continuums may be combined to generate an XY axis or an XYZ axis. Graphical data 128 may include the identification of one or more attribute clusters. As used herein, an "attribute cluster" is a collection of data points representing at least one attribute or characteristic of an entity. An attribute may include any or all of a feature, section, knowledge, asset, or skill of an entity. In non-limiting examples, if an entity is a company, an attribute may include a branch of the company or a particular area of expertise of employees of the company. Attribute cluster may include a single attribute of the entity, or they may include more than one attribute. Attribute clusters may include multiple related attributes. In a non-limiting example, an attribute cluster may include knowledge of how to paint and an inventory of paintbrushes. In another non-limiting example, an attribute cluster may include knowledge of how to use several computer programs, each useful for an aspect of creating virtual artwork. In another non-limiting example, an attribute cluster may include knowledge of how to use a single computer program. In some embodiments, graphical data 128 may include a first graphical datum and a second graphical datum, whereas the first graphical datum is associated with the first entity profile, and the second graphical datum is associated with the second entity profile.

With continued reference to FIG. 1, processor 104 may compare a first graphical datum and a second graphical datum using a comparison machine-learning model 132. As used in the current disclosure, a "comparison machine-learning model" is a machine-learning model that is configured to generate opportunity datum 116 based on the comparison of a first graphical datum and a second graphical datum. Comparison machine-learning model 132 may be consistent with the machine-learning model described below in FIG. 2. Inputs to the comparison machine-learning model 132 may include a plurality of entity profiles 108, entity data 112, opportunity categories 120, examples of opportunity data 116, attribute scores 124, graphical data 128, first graphical datum, second graphical datum, and the like. Outputs to the comparison machine-learning model 132 may include opportunity datum 116 tailored to the comparison of the first graphical datum and the second graphical datum. A comparison of the first graphical datum and a second graphical datum may be a comparison to determine the level of compatibility between the attributes of a first entity and a second entity. In an embodiment, the comparison may include an identification of how well the attributes labeled as assets of one entity complement the attributes labeled as liabilities of a second entity. Comparison training data may include a plurality of data entries containing a plurality of inputs that are correlated to a plurality of outputs for training a processor by a machine-learning process to correlate a first graphical datum and a second graphical datum to examples of opportunity data 116. In an embodiment, comparison training data may include a plurality of first graphical data and a plurality of second graphical data to examples of opportunity data 116. Comparison training data may be received from database 300. Comparison training data may contain information about entity profiles 108, entity data 112, opportunity categories 120, examples of opportunity data 116, attribute scores 124, graphical data 128, first graphical datum, second graphical datum, and the like. In an embodiment, comparison training data may be iteratively updated as a function of the input and output results of past comparison machine-learning model 132 or any other machine-learning model mentioned throughout this disclosure.

With continued reference to FIG. 1, processor 104 identifies the plurality of opportunity data 116 as a function of a comparison between the first graphical datum and the second graphical datum using a comparison fuzzy inference. As used in the current disclosure, a "comparison fuzzy inference" is a method that interprets the values in the input vector (i.e., first graphical datum and second graphical datum.) and, based on a set of rules, assigns values to the output vector. A set of fuzzy rules may include a collection of linguistic variables that describe how the system should make a decision regarding classifying an input or controlling an output. Fuzzy inference rules operate on fuzzy sets and provide a framework for mapping input variables to output variables through linguistic rules. Fuzzy inference rules may operate using linguistic variables, which represent imprecise or vague concepts rather than precise numerical values. Linguistic variables are defined by membership functions, which describe the degree of membership or truth for different linguistic terms or categories. In a non-limiting example, a linguistic variable "Assets" may have linguistic terms like "Strong Asset," "Moderate Asset," and/or "Neutral Asset," each with its corresponding membership function. A fuzzy inference rule typically follows a conditional "IF-THEN" structure. It consists of an antecedent (IF part) and a consequent (THEN part). The antecedent specifies the conditions or criteria based on which the rule will be applied, and the consequent determines the output or conclusion of the rule. In a non-limiting example, of a fuzzy inference rule if a first graphical datum is a "strong asset" then it will be paired with a second graphical datum representing a "strong liability." In another non-limiting example, of a fuzzy inference rule if a first graphical datum is a "moderate liability" then it will be paired with a second graphical datum representing a "moderate asset." In some embodiment, if a first entity has "strong assets" assets and a second entity has "strong liabilities" which correspond to each other in the same or otherwise paired opportunity categories 120, then the pairing of the first entity and the second entity is considered to be a favorable pairing. Using fuzzy inference rules like the rule mentioned herein above, we can compare the assets/liabilities of a first entity and the assets/liabilities of a second entity to assess the opportunity for collaboration between two or more entities based on one or more traits of the entity. The linguistic terms used ("Strong Asset/Liability," "Moderate Asset/Liability," and "Neutral Attribute") are fuzzy sets that represent imprecise concepts rather than precise numerical values. The specific membership functions for these linguistic terms would need to be defined based on the context and criteria relevant to the comparison. When applying a fuzzy inference rule, the membership degrees for the linguistic terms "Strong" and "Moderate" are determined based on the actual asset and liability values of each entity. Fuzzy logic operators like AND, OR, and NOT can be used to combine the membership degrees and evaluate the rule's activation strength. In an embodiment. the opportunity data 116 may be determined by a comparison of the degree of match between a first fuzzy set and a second fuzzy set, and/or single values therein with each other or with either set, which is sufficient for purposes of the matching process.

Still referring to FIG. 1, opportunity data 116 may be determined as a function of the intersection between two fuzzy sets, wherein each fuzzy set may be representative of a first graphical datum and a second graphical datum respectively. Comparing the first graphical datum and a second graphical datum may include utilizing a fuzzy set inference system as described herein below, or any scoring methods as described throughout this disclosure. For example, without limitation, processor 104 may use a fuzzy logic model to determine an opportunity data 116 as a function of fuzzy set comparison techniques as described in this disclosure. In some embodiments, each piece of information associated with a first graphical datum may be compared to a second graphical datum, wherein the opportunity data 116 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a first graphical datum and a second graphical datum to determine the opportunity data 116 specifics to the attributes represented within a plurality of entity profiles 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

With continued reference to FIG. 1, processor 104 may generate collaboration data 136 as a function of the plurality of opportunity data 116. As used in the current disclosure, "collaboration data" is an element of data describing the degree of match between two entities. As used in the current disclosure, a "degree of match" refers to the extent to which two or more entities, systems, or elements can work together harmoniously, effectively, or without conflict. It signifies the degree of suitability, agreement, or alignment between the entities involved. The degree of match between one entity and another entity may be described as how well the entity's assets and liabilities complement each other. In a non-limiting example, a first entity has assets including a plethora of specialized equipment as described by a first opportunity datum 116. A second entity has a liability that includes an abundance of clientele that has work that requires the specialized equipment as described by a second opportunity data 116. Collaboration data 136 may describe a prediction of how well the first entity's assets will mitigate the liability of the second entity. Processor 104 may generate collaboration data 136 by matching the assets and liabilities of the entities as described by their respective opportunity data 116. In a non-limiting example, processor 104 may pair the assets of a first entity with the liabilities of a second entity as represented by a first opportunity datum and a second opportunity datum respectively. The first opportunity datum and the second opportunity datum may be paired based on their respective opportunity scores and the classification into opportunity categories 120. The first opportunity datum and the second opportunity datum may be classified into the same opportunity category to be matched. This may be done for the purpose of ensuring that one entity has the required resources to provide to the second entity. In a non-limiting example, the first entity has an opportunity score of 37 as it relates to the opportunity category for building space, specifically the office space is too small for the entity. A second entity has an opportunity score of 73 as it relates to its building space. A processor 104 may match the first entity to the second entity because the assets of the second entity offset the liabilities of the first entity. Collaboration data 136 may describe that the second entity will provide the first entity with office space in exchange for some consideration.

With continued reference to FIG. 1, collaboration data 136 may include a consideration component. As used in the current disclosure, a "consideration component" is an element of data related to the consideration in a collaboration between two or more entities. As used in the current disclosure, "consideration" is something of value given by a first entity in exchange for something of value given by a second entity. Consideration may refer to the exchange of something of value, such as money, goods, services, equity, a promise to do/not to do something, and the like between the two entities. In other words, consideration is what each entity receives or gives up in exchange for the other party's promise to perform or refrain from performing a certain act. A consideration component may also describe specifics regarding what is exchanged between the parties. This may describe what kind of goods, services, resources, personnel, expertise, and the like will be exchanged between the parties. A consideration component may additionally describe the quantity and the timelines for those above-mentioned deliverables. In a non-limiting example, a consideration component may describe that a first entity will provide a second entity with 15 employees who are qualified as forklift drivers for three business days. While a second entity will provide the first entity with some financial considerations. A consideration component may describe a valuation of the partnership. This may include a valuation of what each party is receiving as a part of participating in the partnership. In furtherance of the above example, a consideration component may be calculated by calculating the daily rate for each of the 15 employees multiplied by three.

With continued reference to FIG. 1, processor 104 may generate collaboration data 136 using a collaboration classifier 140. As used in the current disclosure, a "collaboration classifier" is a classifier that is configured to generate collaboration data 136. The collaboration classifier 140 may be consistent with the classifier and/or machine learning model described below in FIG. 2. Inputs to the collaboration classifier 140 may include entity profile 108, entity data 112, opportunity data 116, opportunity score, opportunity categories 120, examples of collaboration data 136, and the like. Outputs to the collaboration classifier 140 may include collaboration data 136. In an embodiment, a collaboration classifier 140 may be configured to match two or more entities based on their opportunity score and their opportunity data 116. Additionally, the collaboration classifier 140 may be configured to match the assets of a first entity to the liabilities of a second entity. Opportunity training data may include a plurality of data entries containing a plurality of inputs that are correlated to a plurality of outputs for training a processor by a machine-learning process. Opportunity training may include a plurality of opportunity data 116 correlated to examples of collaboration data 136. Opportunity training data may be received from database 300. Opportunity training data may contain information about entity profile 108, entity data 112, opportunity data 116, opportunity score, opportunity categories 120, examples of collaboration data 136, and the like. In an embodiment, a collaboration classifier 140 may be iteratively updated with the input and output results of past collaboration classifier 140. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, machine learning plays a crucial role in enhancing the function of software for generating collaboration data 136, specifically in assessing the extent to which multiple entities, systems, or elements can work together harmoniously and effectively. By analyzing vast amounts of data related to collaborative interactions, machine learning algorithms can identify patterns, correlations, and dependencies that contribute to successful collaboration. These algorithms can extract valuable insights from various sources, including communication logs, project management tools, and shared documents. By applying machine learning techniques, the software can generate collaboration data 136 that measures the level of cooperation, communication, and synergy between different entities, helping to identify areas of improvement and optimize collaborative efforts. Machine learning models may enable the software to learn from past collaborative experiences of the entities and iteratively improve its training data over time. By leveraging historical data, the machine learning model can recognize patterns of conflict, identify common obstacles to effective collaboration, and propose strategies to overcome them. This iterative learning process empowers the software to continuously refine its understanding of collaboration dynamics and generate more accurate and actionable collaboration data. Ultimately, by leveraging machine learning, software can provide valuable insights and recommendations to enhance collaboration, facilitate effective teamwork, and drive better outcomes for organizations and individuals alike.

With continued reference to FIG. 1, Processor 104 may be configured to update the training data of the collaboration classifier 140 using user inputs. A collaboration classifier 140 may use user input to update its training data, thereby improving its performance and accuracy. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, the accuracy of a plurality of collaboration data may be averaged to determine an accuracy score. In some embodiments, an accuracy score may be determined for pairing of entities. For example, user feedback for a pairing of entities may be averaged together to determine the accuracy score for that particular cohort of user. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining.

Still referring to FIG. 1, the processor may be configured to generate a machine-learning model, such as collaboration classifier 140, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as collaboration classifier 140, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 is configured to determine a collaboration score 144 as a function of the collaboration data 136. As used in the current disclosure, "collaboration score" is a score that describes how well the collaboration of the entities addresses the needs of each entity. A processor 104 may generate collaboration score 144 for each entity that is participating in the collaboration. The collaboration score 144 for each entity may be based on how well the consideration component addresses the needs of each entity. In a non-limiting example, a first entity receives consideration component including exchanging equity in their entity for a sum of money. A collaboration score 144 may describe how well the sum of money addresses the needs of the first entity at the cost of the equity. If it is a favorable deal to the first entity the collaboration score 144 may be high, conversely if it is an unfavorable deal to the first entity the collaboration score 144 may be low. Collaboration score 144 may be expressed as a numerical score or a linguistic value. Collaboration score 144 may be represented as a score used to reflect the favorability of the collaboration to each entity. A non-limiting example, of a numerical scale, may include a scale from 1-10, 1-100, 1-1000, and the like, wherein a rating of 1 may represent a collaboration with unfavorable terms for the entity, whereas a rating of 10 may represent a collaboration with favorable terms for the entity. Examples of linguistic values may include, "Unfavorable Terms," "Fair Terms," "Favorable Terms," "Highly Favorable Terms," and the like. In some embodiments, a linguistic variable score range may be represented by a linguistic value. As used in the current disclosure, a "linguistic variable score range" is a range of scores that are associated with a linguistic value. For example, this may include a score of 0-2 representing "Unfavorable Terms" or a score of 8-10 representing "Highly Favorable Terms." The consideration component may be scored by classifying the current consideration components to examples of collaboration score 144 from third parties who are similarly situated by size, assets/liabilities, revenue, and the like. In an embodiment, the collaboration score 144 may be displayed in a graphical manner. This may include displaying the collaboration score 144 displaying it as a line graph, bar graph, pie chart, scatter plot, histogram, box and whisker plot, heat map, network graph, and the like.

With continued reference to FIG. 1, processor 104 may generate the collaboration score 144 using a score machine-learning model. As used in the current disclosure, a "score machine-learning model" is a machine-learning model that is configured to generate a collaboration score 144. Score machine-learning model may be consistent with the machine-learning model described below in FIG. 2. Inputs to the score machine-learning model may include entity profile 108, entity data 112, opportunity data 116, collaboration data 136, consideration component, examples of collaboration score 144, and the like. Outputs to the score machine-learning model may include a collaboration score 144 tailored to the consideration component of each entity. Score training data is a plurality of data entries containing a plurality of inputs that are correlated to a plurality of outputs for training a processor by a machine-learning process. In an embodiment, score training data may include a plurality of consideration components correlated to examples of collaboration scores 144. Score training data may be received from database 300. Score training data may contain information regarding entity profile 108, entity data 112, opportunity data 116, collaboration data 136, consideration component, examples of collaboration score 144, and the like. In an embodiment, a score machine-learning model may be iteratively updated with the input and output results of past score machine-learning models. Machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning models, learning vector quantization, and/or neural network-based machine-learning models.

With continued reference to FIG. 1, a linguistic variable score range representing collaboration score 144 may be adjusted using linguistic values. Processor 104 may adjust the linguistic variable score range according to the desired consideration component of each entity as reflected by the collaboration score. A linguistic variable score range may be determined by comparing the desired consideration component of each entity from the user to previous iterations of the linguistic variable score ranges. In an embodiment, a linguistic variable score range may be determined by comparing the desired consideration component of each entity to consideration that is currently offered by the other entity. Previous iterations' linguistic variable score ranges may be taken from users who are similarly situated to the current user by experience, job title, task, and overall score, and the like. Previous iterations of a linguistic variable score range may be received from database 300. A linguistic variable score range may be generated using a range machine learning model. As used in the current disclosure, a "range machine-learning model" is a machine-learning model that is configured to identify a linguistic variable score range. The range machine-learning model may be consistent with the machine-learning model described below in FIG. 2. Inputs to the range machine-learning model may include an entity profile 108, entity data 112, opportunity data 116, collaboration data 136, consideration component, collaboration score 144, examples of linguistic variable score ranges, and the like. Outputs to the range machine-learning model may include a linguistic variable score range that is tailored to the entity. Range training data is a plurality of data entries containing a plurality of inputs that are correlated to a plurality of outputs for training a processor by a machine-learning process to correlate collaboration score 144 to examples of linguistic variable score ranges. Range training data may be received from database 300. Range training data may contain information about entity profile 108, entity data 112, opportunity data 116, collaboration data 136, consideration component, collaboration score 144, examples of linguistic variable score ranges, and the like. Range training data may include correlations between collaboration scores 144 to examples of linguistic variable score ranges. Machine learning model may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to draft a collaboration report 148 as a function of the consideration component and the collaboration score 144. As used in the current disclosure, a "collaboration report" is a document that describes the collaboration between the entities. A collaboration report 148 may include a written description of the consideration component. A collaboration report 148 may include a legal contract. In an embodiment, a collaboration report 148 may include a written description of the deliverables, consideration components, timelines, and the like. A collaboration report 148 may outline specifics regarding what is expected of both parties. A collaboration report 148 may outline the terms and conditions governing a partnership or joint venture between two or more parties. This type of agreement is used when parties wish to work together on a specific project, business venture, or other shared endeavor. The collaboration report 148 typically specifies the nature and scope of the collaboration, as well as the roles and responsibilities of each party involved. It may also include provisions related to intellectual property ownership, confidentiality, and dispute resolution. In collaboration report 148, the parties involved may agree to share resources, information, and expertise to achieve a common goal. The agreement may also address issues related to funding, marketing, and distribution of any products or services resulting from the collaboration. The collaboration report 148 may be designed to ensure that all parties involved are aware of their obligations and responsibilities and that the partnership is conducted in a mutually beneficial and transparent manner. Processor 104 may generate a collaboration report 148 using a machine learning model or large language model as described herein below. A collaboration report 148 may also be generated by comparing historical versions of collaboration reports 148 to the current consideration component and the collaboration data 136 of the current entities. A collaboration report 148 may also be generated as a function of the opportunity categories 120 of the entities. Entities with similar assets and liabilities may require similar content within collaboration reports 148. A processor 104 may capitalize on this fact to generate a collaboration report 148 the current collaboration of the entities.

With continued reference to FIG. 1, a collaboration report 148 may include a set of ground rules. As used in the current disclosure, "ground rules" are a set of guidelines between two or more entities. These guidelines may refer to the rules, principles, or provisions that outline the expectations, responsibilities, and conditions for all parties involved. These ground rules serve as a framework for the working relationship between the entities. The ground rules may be used to ensure clarity, fairness, and mutual understanding between the parties. Ground rules may outline the purpose and scope of the agreement. Ground rules may clearly define the purpose of the agreement and the scope of the relationship between the entities. They may outline what the parties intend to achieve through the contract and the specific activities or obligations covered. The ground rules may include the specific terms and conditions of the contract. This may encompass the duration of the agreement, termination or renewal provisions, payment terms, intellectual property rights, confidentiality obligations, dispute resolution mechanisms, and any other essential contractual provisions. Ground rules may include performance expectations and deliverables of each party. It defines the quality standards, timelines, milestones, and metrics by which the performance will be evaluated. This section may also include provisions related to non-performance or breach of obligations. Ground rules may specify the responsibilities and obligations of each party involved. It details the actions, tasks, or services that each party is expected to perform and any specific requirements or conditions associated with them.

With continued reference to FIG. 1, processor 104 may generate a collaboration report 148 using a report machine-learning model. As used in the current disclosure, a "report machine-learning model" is a machine-learning model that is configured to generate collaboration report 148. Report machine-learning model may be consistent with the machine-learning model described below in FIG. 2. Inputs to the report machine-learning model may include an entity profile 108, entity data 112, opportunity data 116, collaboration data 136, consideration component, collaboration score 144, examples of collaboration reports 148, and the like. Outputs to the report machine-learning model may include collaboration report 148 which is tailored to the partnership. Report training data may include a plurality of data entries containing a plurality of inputs that are correlated to a plurality of outputs for training a processor by a machine-learning process to correlate collaboration data 136 and collaboration scores 144 to examples of collaboration reports 148. In an embodiment, report training data may include a correlate collaboration data 136 and collaboration scores 144 to examples of collaboration reports 148. Report training data may be received from database 300. Report training data may contain information about entity profile 108, entity data 112, opportunity data 116, collaboration data 136, consideration component, collaboration score 144, examples of collaboration reports 148, and the like. In an embodiment, report training data may be iteratively updated as a function of the input and output results of past report machine-learning models.

Referring now to FIG. 1, processor 104 may use a large language model 152 (LLM) to generate collaboration report 148. A "large language model," as used herein, is a deep learning algorithm that can recognize, summarize, translate, predict and/or generate text and other content based on knowledge gained from massive datasets. Large language model 152 may be trained on large sets of data; for example, training sets may include greater than 1 million words. Training sets may be drawn from diverse sets of data such as, as non-limiting examples, novels, blog posts, articles, emails, and the like. In some embodiments, training sets may include a variety of subject matters, such as, as nonlimiting examples, medical tests, romantic ballads, beat poetry, emails, advertising documents, newspaper articles, historical electronic media, historical textual media, entity profile 108, entity data 112, opportunity data 116, collaboration data 136, consideration component, collaboration score 144, examples of collaboration reports 148, and the like. and the like. In some embodiments, training sets of LLM 152 may include a plurality of textual media. In some embodiments, training sets of LLM 152 may include a knowledge database. As a non-limiting example, training sets may include scholastic works, scholarly papers, articles, examples of collaboration reports 148, legal contracts, consideration components, and the like.

With continued reference to FIG. 1, in some embodiments, LLM 152 may be generally trained. For the purposes of this disclosure, "generally trained" means that LLM 152 is trained on a general training set comprising a variety of subject matters, data sets, and fields. In some embodiments, LLM 152 may be initially generally trained. In some embodiments, for the purposes of this disclosure, LLM 152 may be specifically trained. For the purposes of this disclosure, "specifically trained" means that LLM 152 is trained on a specific training set, wherein the specific training set includes data including specific correlations for LLM 152 to learn. As a non-limiting example, LLM 152 may be generally trained on a general training set, then specifically trained on a specific training set. As a non-limiting example, specific training set may include textual media. As a non-limiting example, specific training set may include scholastic works, collaboration agreements, statements of intent, legal contracts, industry-specific contracts, contract templates, user-provided data, legal corpus, and the like. As a non-limiting example, specific training set may include information from media database 300.

With continued reference to FIG. 1, LLM 152, in some embodiments, may include Generative Pretrained Transformer (GPT), GPT-2, GPT-3, GPT-4, GPT-5, and the like. GPT, GPT-2, GPT-3, GPT-4, and GPT-5 are products of Open AI Inc., of San Francisco, CA. LLM 152 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 152 may output such predictions by ranking words by likelihood or a prompt parameter. For the example given above, the LLM may score "you" as the most likely, "your" as the next most likely, "his" or "her" next, and the like. LLM 152 may include an encoder component and a decoder component.

Still referring to FIG. 1, LLM 152 may include a transformer architecture. In some embodiments, encoder component of LLM 152 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once.

"Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 152 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 152 may predict the next word by searching for a set of positions in a source sentence where the most relevant information is concentrated. LLM 152 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 152, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 152 may pick up particular parts at different positions in the input sequence and over time compute an initial composition of the output sequence. In multi-head attention, LLM 152 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 152 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 152 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 152 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM 152 may learn to associate the word "you", with "how" and "are". It is also possible that LLM 152 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM 152 to learn to extract and focus on different combinations of attention from its attention heads.

With continued reference to FIG. 1, LLM 152 may receive input. Input may include a string of one or more characters. An input may additionally be included in data disclosed within the entirety of this disclosure. An input may include entity data 112, operational Data 116, collaboration score 144, collaboration components, collaboration data 136, historical collaboration report, and the like. For example, an input may include one or more words, a sentence, a paragraph, a thought, a query, file wrapper, a patent, a trademark, a copyright, and the like. In some embodiments, in addition to the above-mentioned data a user may input additional information into the LLM 152. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. Query may include, for example, a question asking for a contract for a partnership between two or more entities. In some embodiments, input may include a set of deliverables between the entities.

With continued reference to FIG. 1, LLM 152 may generate output. In some embodiments, LLM 152 may include multiple sets of transformer architecture as described above. Output may include a textual output. A "textual output," for the purposes of this disclosure is an output comprising a string of one or more characters. Textual output may include, for example, a collaboration report 148. In some embodiments, collaboration report 148 may be collaboration report 148 from collaboration database 300. In some embodiments, textual output may include a listing of specific deliverables for both entities. In some embodiments, textual output may include a phrase or sentence suggesting the addition of a confidentiality clause or dispute resolution clauses. LLM 152 may be configured to populate "fill-in-the-blank" style contracts or forms using the textual output. In an embodiment, processor 104 may classify the textual output based on its content to one more fields that need to be filled in.

Still referring to FIG. 1, processor 104 may be configured to display collaboration report 148 using a display device 156. As used in the current disclosure, a "display device" is a device that is used to display a plurality of data and other digital content. A display device 156 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
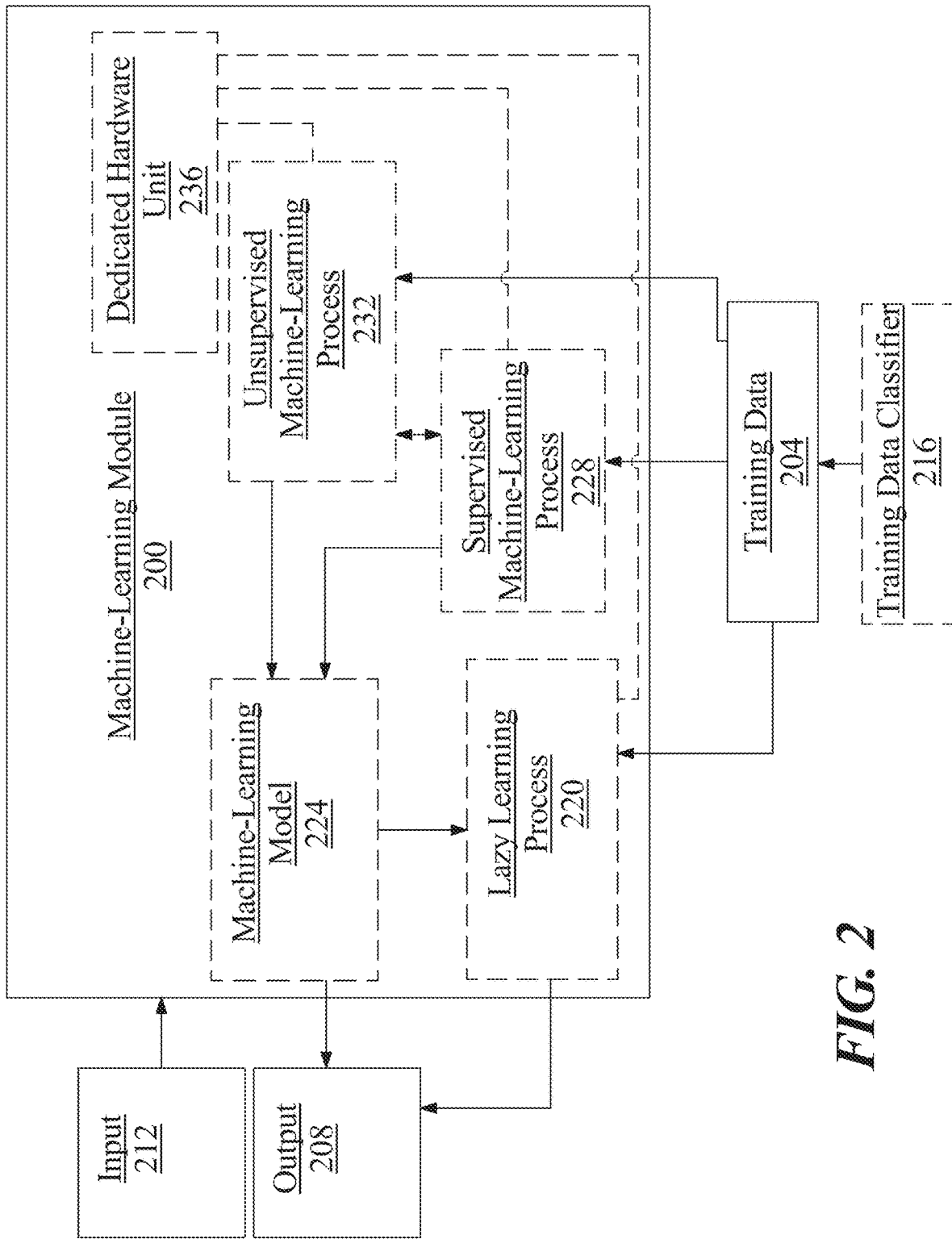
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a plurality of opportunity data 116 as inputs and a plurality of collaboration data 136 as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to cohorts of entities such as according to entity size, industry, total sales, entity infrastructure, field of business, and the like.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include entity profile 108, entity data 112, opportunity data 116, opportunity score, opportunity categories 120, examples of collaboration data 136, as described above as inputs, collaboration data 136 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
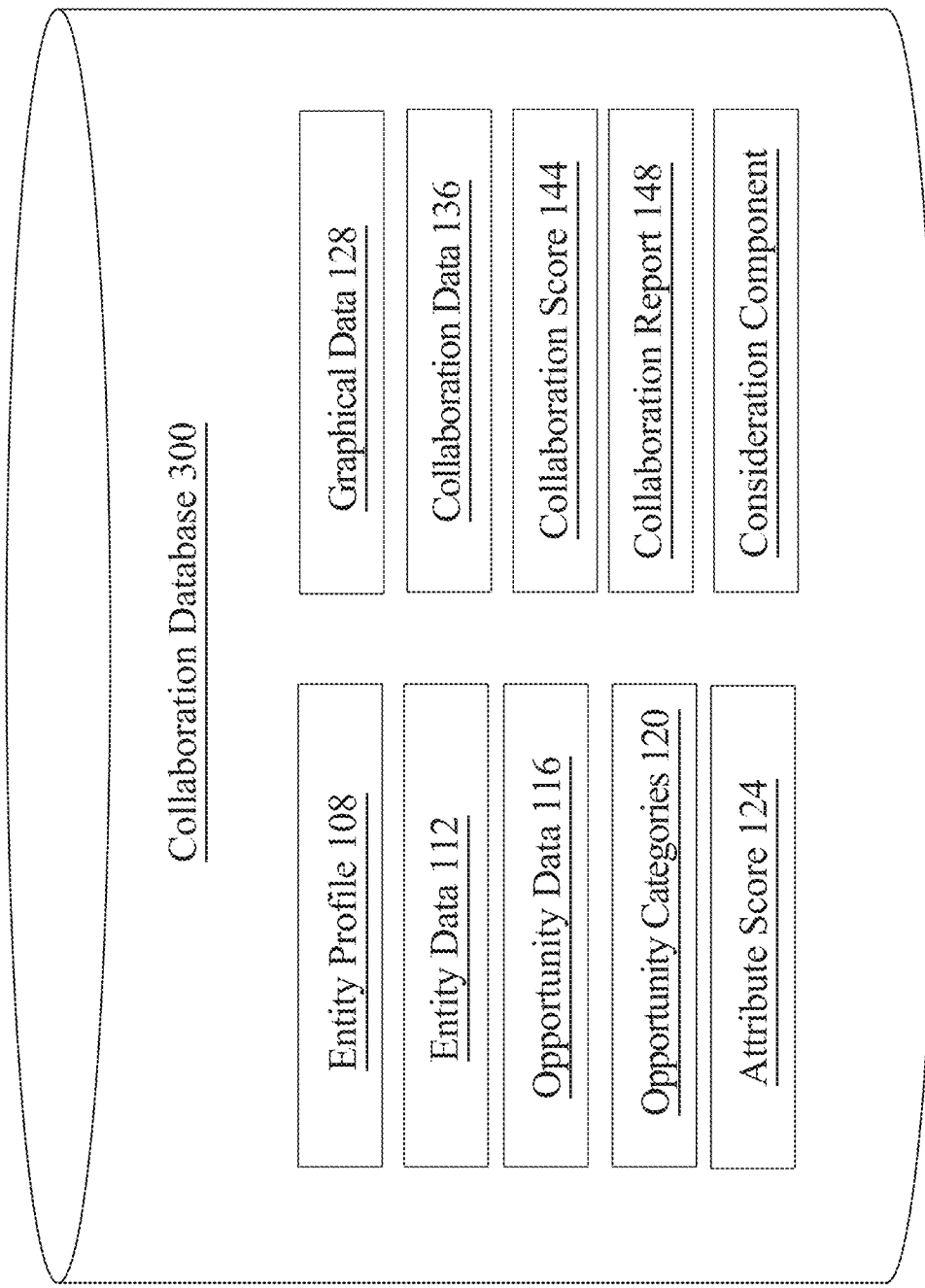
FIG. 3 is a block diagram of an exemplary embodiment of a collaboration database.

Now referring to FIG. 3, an exemplary collaboration database 300 is illustrated by way of block diagram. In an embodiment, any past or present versions of any data disclosed herein may be stored within the collaboration database 300 including but not limited to: entity profile 108, entity data 112, opportunity data 116, collaboration data 136, consideration component, collaboration score 144, examples of collaboration reports 148, and the like. Processor 104 may be communicatively connected with collaboration database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Collaboration database 300 may be implemented, without limitation, as a relational database, a key-value retrieval database such as a NOSQL database, or any other format or structure for use as a database that a person skilled in the art would recognize as suitable upon review of the entirety of this disclosure. Collaboration database 300 may alternatively or additionally be implemented using a distributed data storage protocol and/or data structure, such as a distributed hash table or the like. Collaboration database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
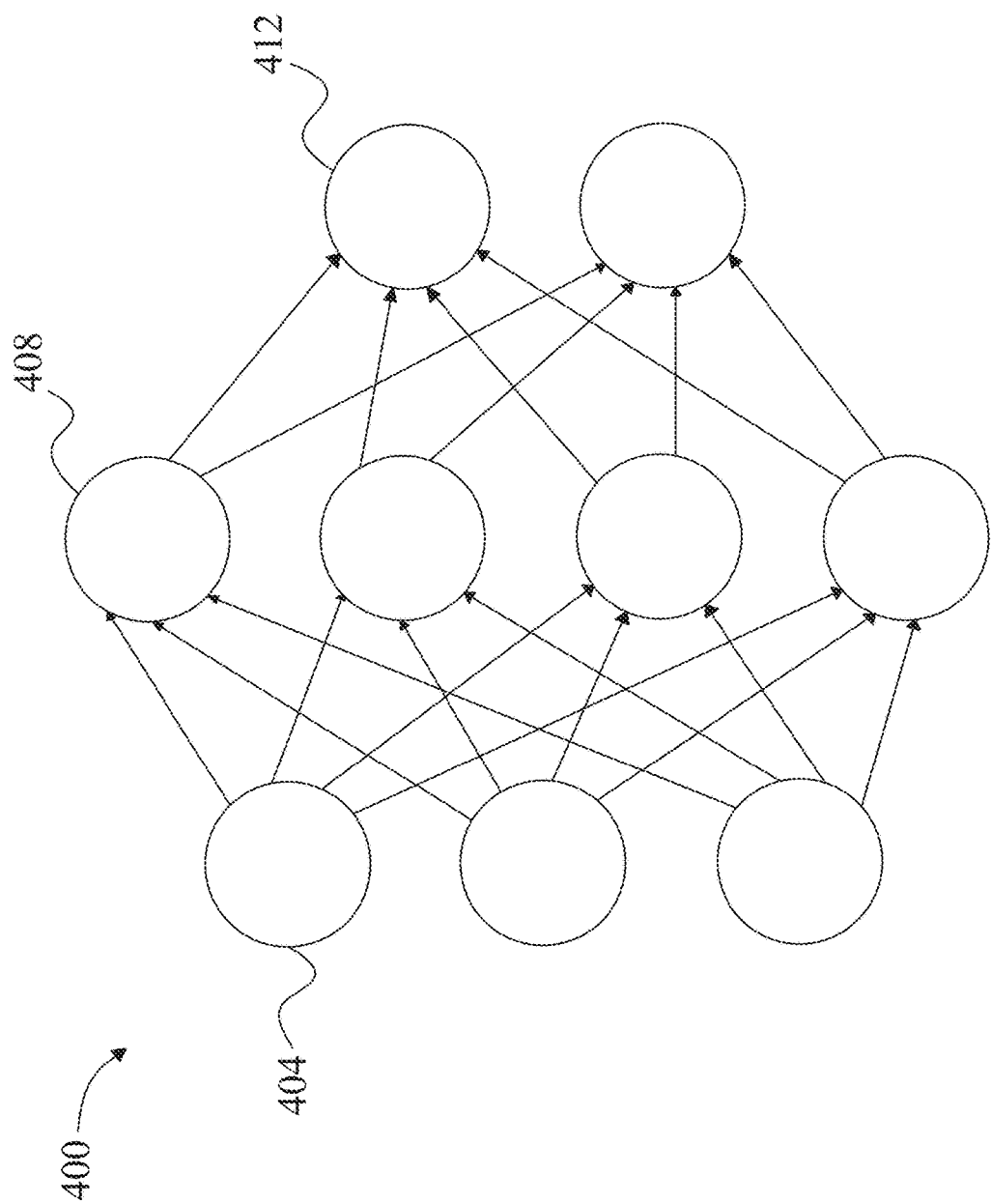
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
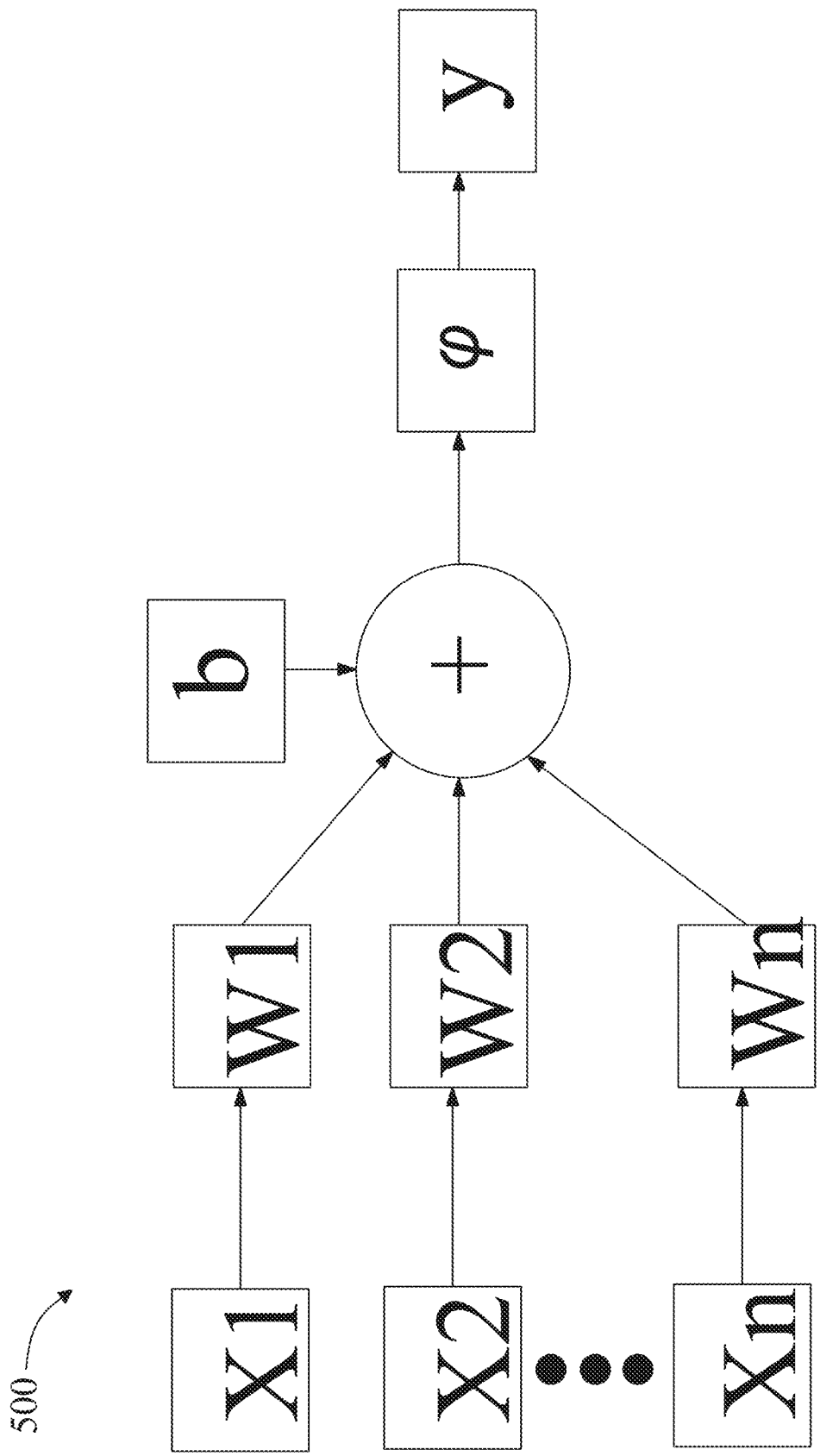
FIG. 5 is a diagram of an exemplary embodiment of a node of a neural network.

Referring now to FIG. 5, an exemplary embodiment of a node of a neural network is illustrated. A node may include, without limitation, a plurality of inputs x, that may receive numerical values from inputs to a neural network containing the node and/or from other nodes. Node may perform a weighted sum of inputs using weights $w_i$ that are multiplied by respective inputs $x_1$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w', may be determined by training a neural network using training data, which may be performed using any suitable process as described above.

Figure 6:
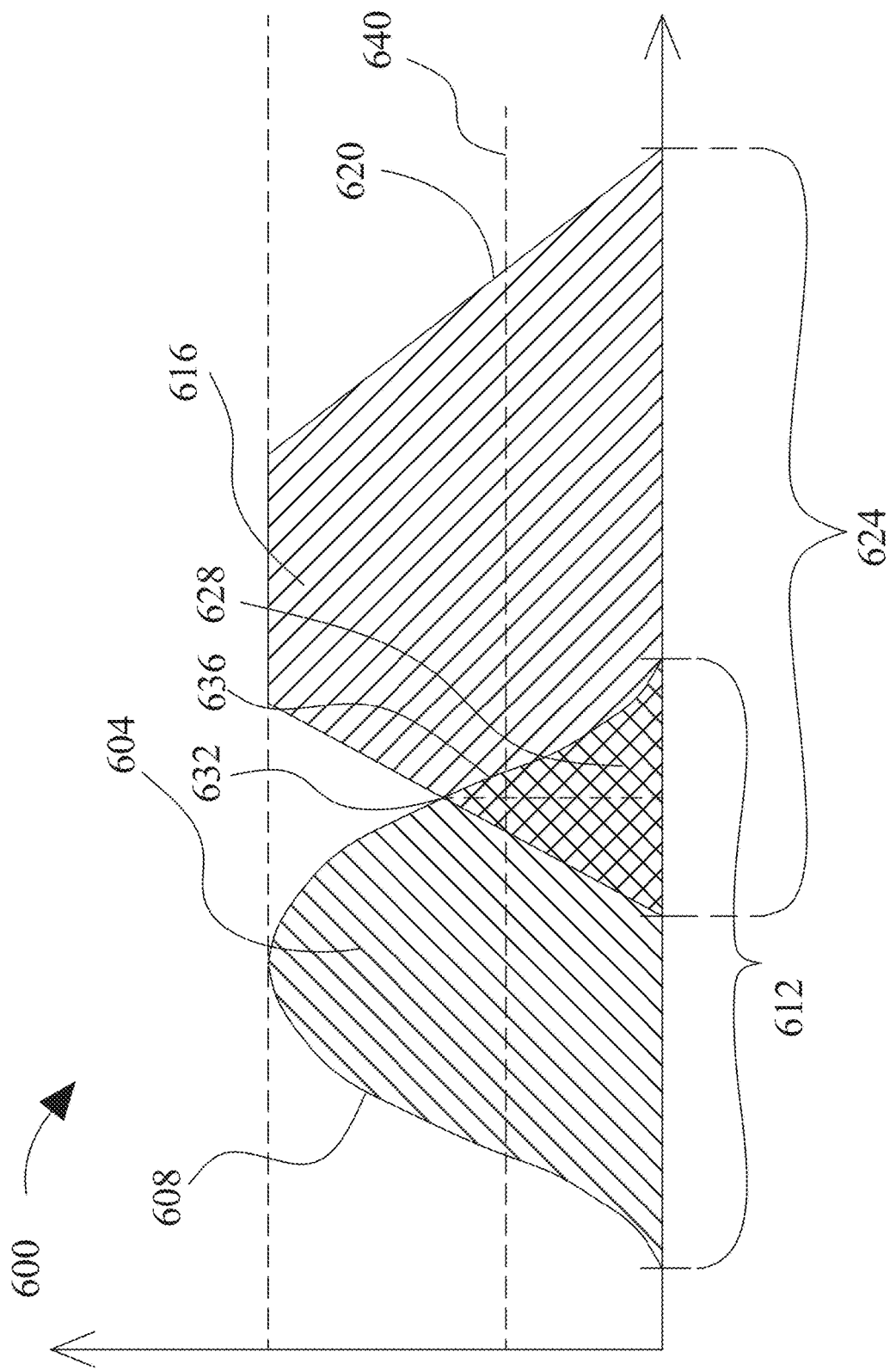
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent entity data 112 and opportunity data 116 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input entity data 112 and opportunity data 116. For instance, an acceptance variable may represent a first measurable value pertaining to the classification of entity data 112 to opportunity data 116. Continuing the example, an output variable may represent an opportunity data 116 tailored to the entity profile 108. In an embodiment, entity data 112 and/or opportunity data 116 may be represented by their own fuzzy set. In other embodiments, an opportunity data 116 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any an entity data 112 and opportunity data 116. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an opportunity data 116 may indicate a sufficient degree of overlap with fuzzy set representing an entity data 112 and opportunity data 116 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both entity data 112 and opportunity data 116 have fuzzy sets, an opportunity data 116 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
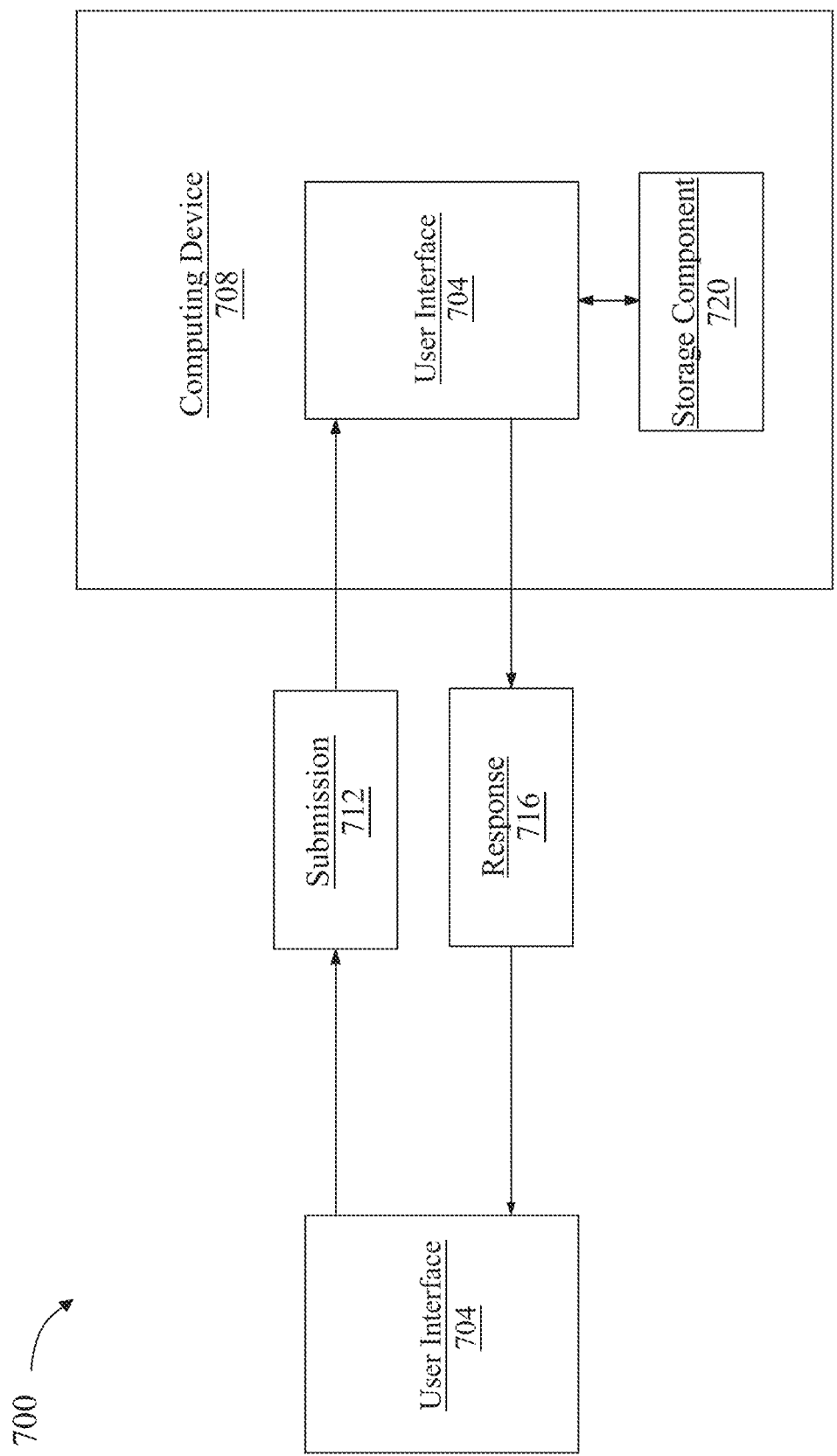
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
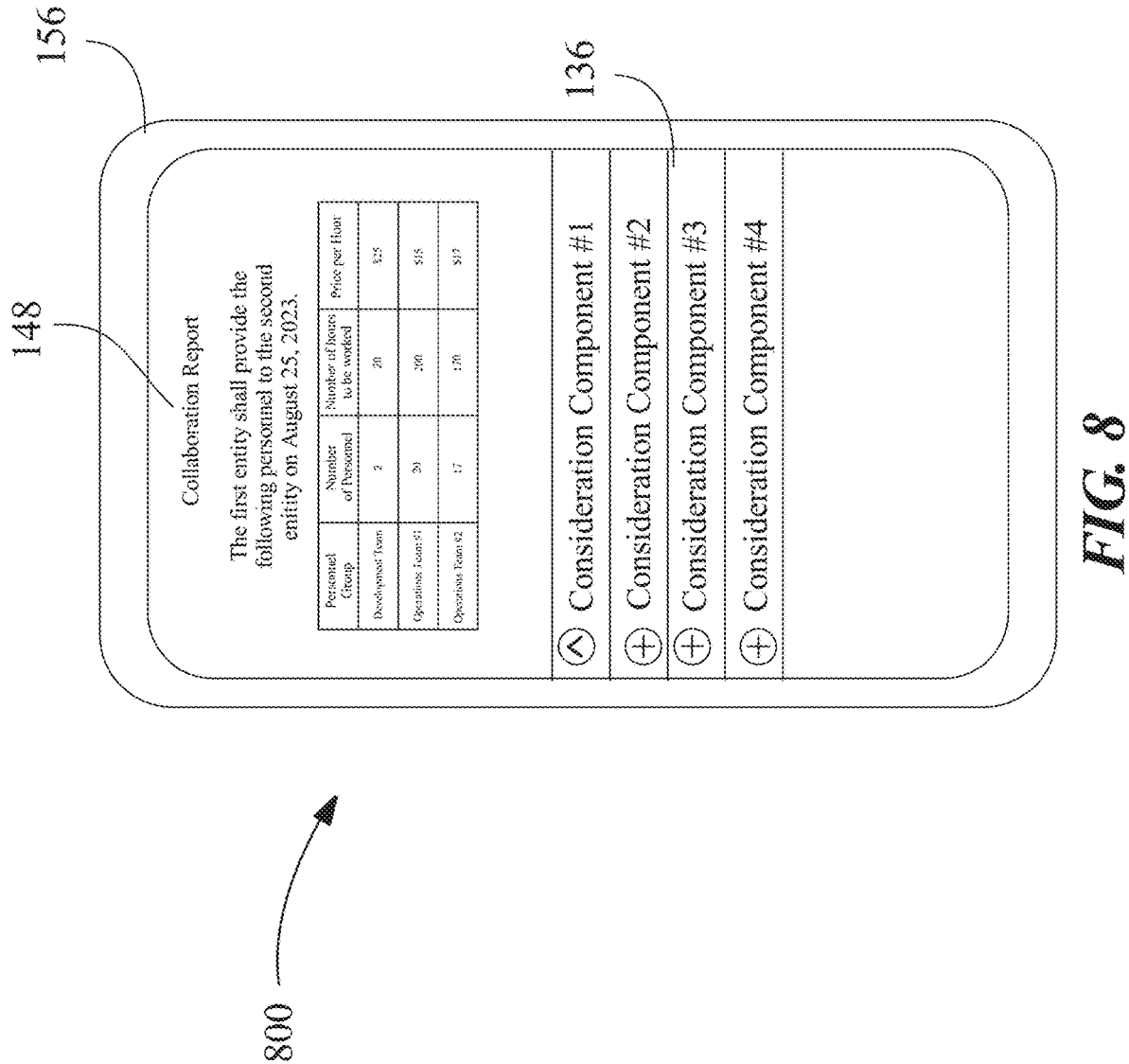
FIG. 8 is an exemplary embodiment of a user interface.

Now referring to FIG. 8, an exemplary representation of a user interface component is presented. User interface 800 may include a display device such as display device 156. In an embodiment, user interface 800 may display a collaboration report 148. A collaboration report 148 may be a written agreement between two or more entities. In some embodiments, a collaboration report 148 displayed on user interface 800 may allow an entity to edit the collaboration report 148. Each party may be notified of any change to the collaboration report 148. In some cases, the changes to collaboration report 148 may be highlighted or underlined to bring it to the attention of all entities. In some embodiments, user interface 800 may allow the entities to sign the collaboration report 148 using a digital signature. This signature may be used as a mechanism to signify the mutual assent of both parties to the consideration components of the collaboration report 148. The digital signature may also be used to allow both parties to acknowledge the receipt of the collaboration report 148. In some embodiments, user interface 800 may display a plurality of questions that require the user to enter information regarding the entity profile 108 and entity data 112, wherein the user is able to enter information regarding themselves or their entity. This may be done using the chatbot system of FIG. 7, which may be implemented using user interface 800.

Figure 9:
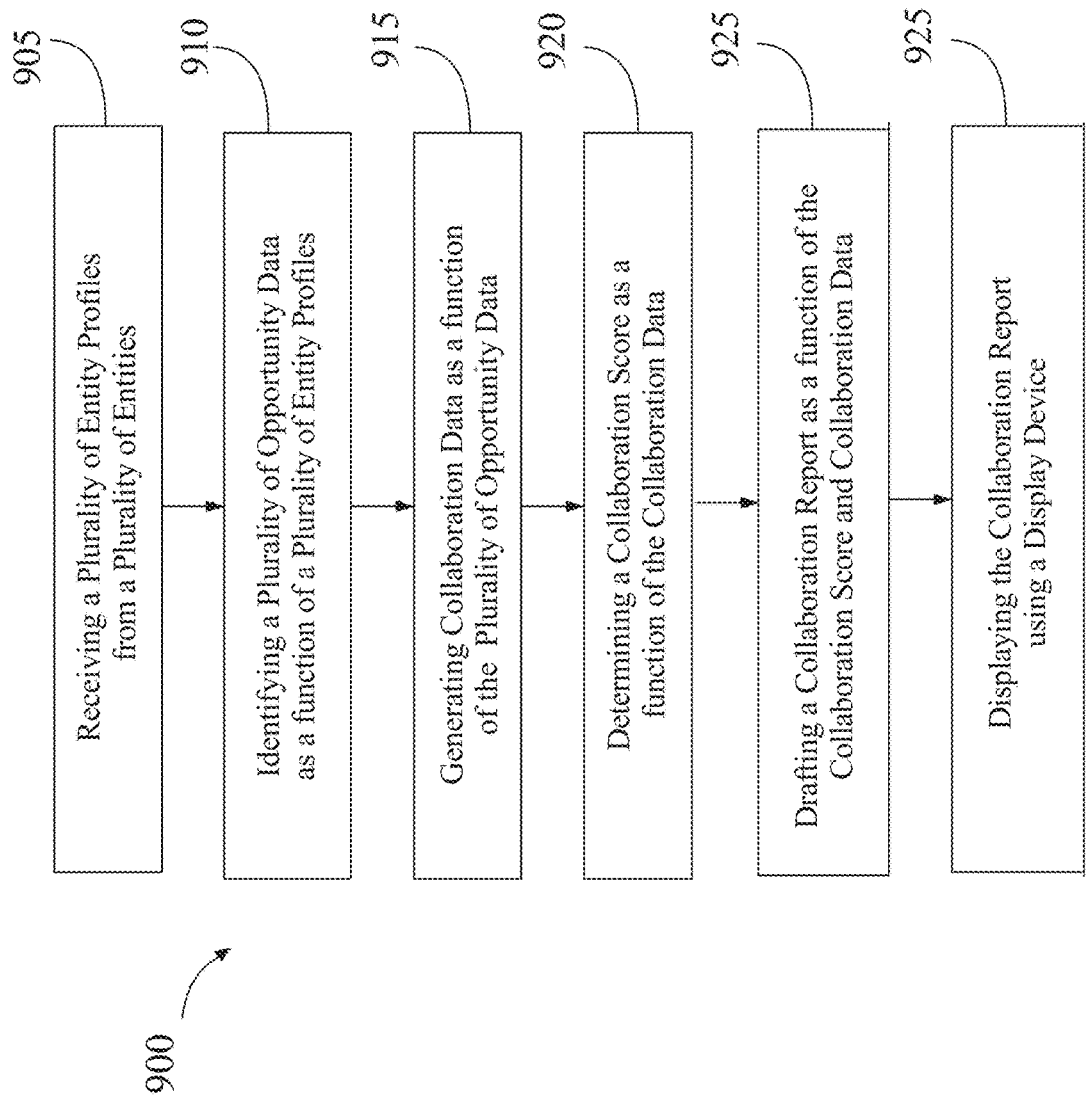
FIG. 9 is a flow diagram of an exemplary method for the generation of a collaboration score.

Referring now to FIG. 9, a flow diagram of an exemplary method 900 for the generation of a collaboration score is illustrated. At step 905, method 900 includes receiving, using at least a processor, a plurality of entity profiles from a plurality of entities, wherein each of the plurality of entity profiles includes entity data. This may be implemented as described and with reference to FIGS. 1-9. In some embodiments, extracting the entity profile may include extracting the entity profile using a WebCrawler or a chatbot.

Still referring to FIG. 9, At step 910, method 900 includes identifying, using the at least a processor, a plurality of opportunity data as a function of the plurality of entity profiles. This may be implemented as described and with reference to FIGS. 1-9.

Still referring to FIG. 9, At step 915, method 900 includes generating, using the at least a processor, collaboration data as a function of the plurality of opportunity data. Generating opportunity data additionally includes classifying the entity data into a plurality of opportunity categories; determining an attribute score as a function of the classification the plurality of entity profiles; plotting a plurality graphical data as a function of the attribute score, wherein a plurality of graphical data comprises a first graphical datum associated with the first entity profile and a second graphical datum associated with the second entity profile; and identifying the plurality of opportunity data as a function of a comparison of the first graphical datum and the second graphical datum. This may be implemented as described and with reference to FIGS. 1-9. In an embodiment, opportunity data includes a description of the assets and liabilities associated with an entity. In an embodiment, each of the plurality of opportunity data may include an opportunity rank. In another embodiment, The method may include identifying a plurality of opportunity data using a fuzzy inference set.

Still referring to FIG. 9, At step 920, method 900 includes determining, using the at least a processor, a collaboration score as a function of the collaboration data. This may be implemented as described and with reference to FIGS. 1-9. In an embodiment, the collaboration data may include a consideration component. In another embodiment, the method may further include generating the collaboration data using a collaboration classifier. Generating the collaboration data using a collaboration classifier may include training the collaboration classifier using collaboration training data, wherein the collaboration training data contains a plurality of data entries containing the plurality of opportunity data as an input correlated to the collaboration data as an output and generating collaboration data as a function of the plurality of opportunity data using a trained collaboration classifier.

Still referring to FIG. 9, At step 925, method 900 includes drafting, using the at least a processor, a collaboration report as a function of the collaboration score and the collaboration data. This may be implemented as described and with reference to FIGS. 1-9. In an embodiment, the method may include drafting the collaboration report using a large language model.

Still referring to FIG. 9, At step 930, method 900 includes displaying the collaboration report using a display device. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
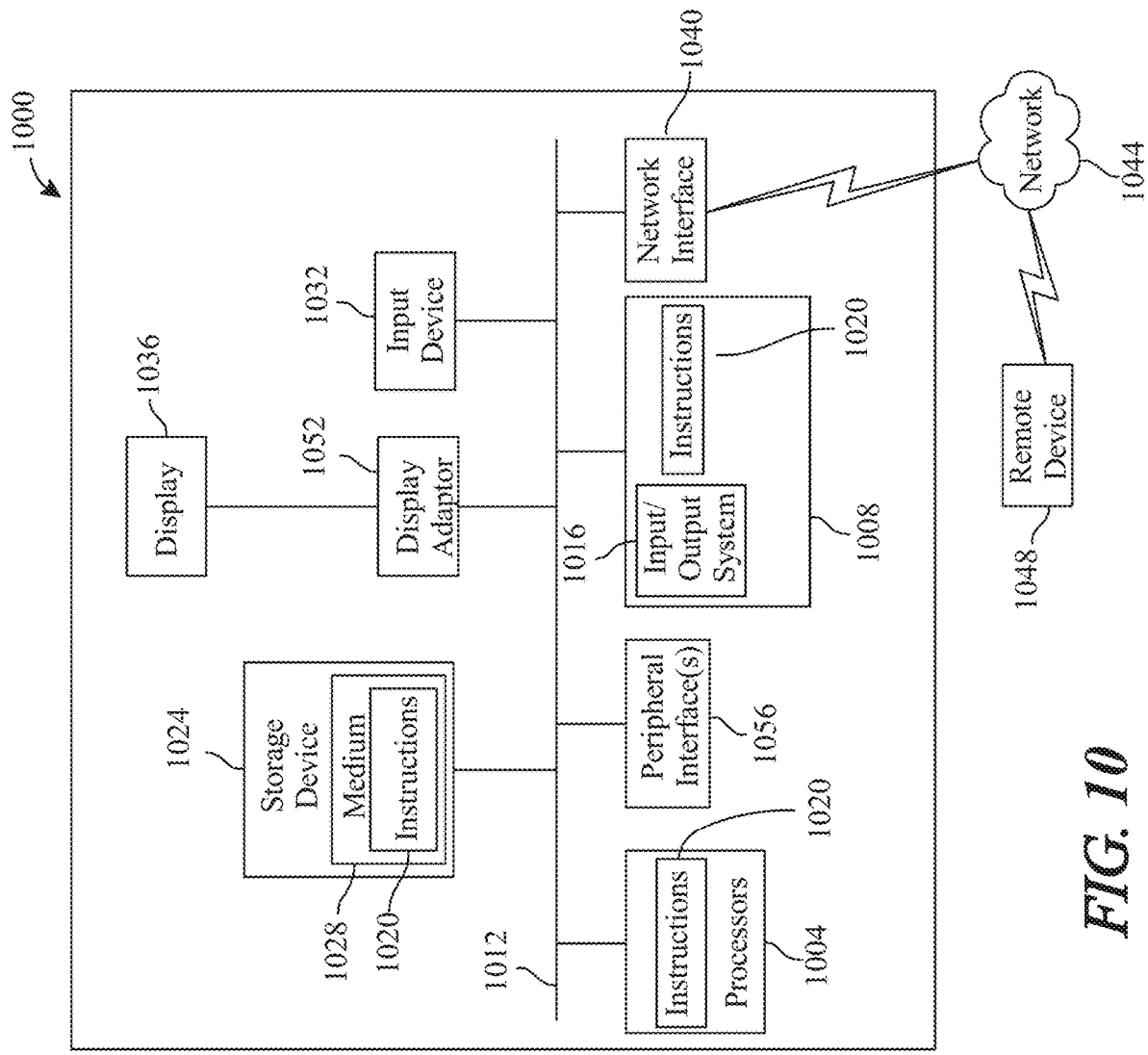
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the generation of a collaboration score, wherein the apparatus comprises:
   at least a processor; and
   a memory communicatively connected to the at least a processor, wherein the memory contains instructions configuring the at least a processor to:
     receive a plurality of entity profiles from a plurality of entities, wherein each of the plurality of entity profiles comprises entity data, wherein the plurality of entity profiles comprises a first entity profile and a second entity profile;
     identify a plurality of opportunity data as a function of the plurality of entity profiles, wherein identifying the plurality of opportunity data comprises:
       classifying the plurality of entity profiles into a plurality of opportunity categories;
       determining an attribute score as a function of the classification the plurality of entity profiles;
       plotting a plurality of graphical data as a function of the attribute score, wherein the plurality of graphical data comprises:
         a first graphical datum associated with the first entity profile; and
         a second graphical datum associated with the second entity profile; and
       identifying the plurality of opportunity data as a function of a comparison of the first graphical datum and the second graphical datum;
     generate collaboration data comprising a degree of match between the first entity profile's assets and liabilities and the second entity profile's assets and liabilities as a function of the plurality of opportunity data;

determine a collaboration score as a function of the collaboration data;

draft a collaboration report as a function of the collaboration score and the collaboration data; and display the collaboration report using a display device.

2. The apparatus of claim 1, wherein drafting the collaboration report comprises drafting the collaboration report using a large language model.

3. The apparatus of claim 1, wherein the plurality of opportunity data comprises a description of assets associated with an entity.

4. The apparatus of claim 3, wherein the plurality of opportunity data comprises a description of liabilities associated with the entity.

5. The apparatus of claim 1, wherein receiving the plurality of entity profiles comprises receiving the plurality of entity profiles using a web crawler.

6. The apparatus of claim 1, wherein the plurality of graphical data comprises a plurality of attribute clusters.

7. The apparatus of claim 1, wherein identifying the plurality of opportunity data comprises identifying the plurality of opportunity data by comparing the first graphical datum and the second graphical datum using a fuzzy inference set.

8. The apparatus of claim 1, wherein the collaboration data comprises a consideration component.

9. The apparatus of claim 1, wherein generating the collaboration data comprises generating the collaboration data using a collaboration classifier.

10. The apparatus of claim 9, wherein generating the collaboration data using the collaboration classifier comprises:

training the collaboration classifier using collaboration training data, wherein the collaboration training data contains a plurality of data entries containing a plurality of opportunity data inputs correlated to a plurality of collaboration data outputs; and generating the collaboration data as a function of the plurality of opportunity data using a trained collaboration classifier.

11. A method for the generation of a collaboration score, wherein the method comprises:

receiving, using at least a processor, a plurality of entity profiles from a plurality of entities, wherein each of the plurality of entity profiles comprises entity data, wherein the plurality of entity profiles comprises a first entity profile and a second entity profile;

identifying, using the at least a processor, a plurality of opportunity data as a function of the plurality of entity profiles, wherein identifying the plurality of opportunity data comprises:

classifying the plurality of entity profiles into a plurality of opportunity categories;

determining an attribute score as a function of the classification the plurality of entity profiles;

plotting a plurality of graphical data as a function of the attribute score, wherein the plurality of graphical data comprises:

a first graphical datum associated with the first entity profile; and a second graphical datum associated with the second entity profile; and identifying the plurality of opportunity data as a function of a comparison of the first graphical datum and the second graphical datum;

generating, using the at least a processor, collaboration data comprising a degree of match between the first entity profile's assets and liabilities and the second entity profile's assets and liabilities as a function of the plurality of opportunity data;

determining, using the at least a processor, a collaboration score as a function of the collaboration data;

drafting, using the at least a processor, a collaboration report as a function of the collaboration score and the collaboration data; and displaying the collaboration report using a display device.

12. The method of claim 11, wherein the method further comprises drafting the collaboration report using a large language model.

13. The method of claim 11, wherein the plurality of opportunity data comprises a description of assets associated with an entity.

14. The method of claim 13, wherein the plurality of opportunity data comprises a description of liabilities associated with the entity.

15. The method of claim 11, wherein the method further comprises receiving the plurality of entity profiles using a web crawler.

16. The method of claim 11, wherein the plurality of graphical data comprises a plurality of attribute clusters.

17. The method of claim 11, wherein the method further comprises identifying, using the at least a processor, the plurality of opportunity data by comparing the first graphical datum and the second graphical datum using a fuzzy inference set.

18. The method of claim 11, wherein the collaboration data comprises a consideration component.

19. The method of claim 11, wherein the method further comprises generating the collaboration data using a collaboration classifier.

20. The method of claim 19, wherein:

training the collaboration classifier using collaboration training data, wherein the collaboration training data contains a plurality of data entries containing a plurality of opportunity data inputs correlated to a plurality of collaboration data outputs; and generating the collaboration data as a function of the plurality of opportunity data using a trained collaboration classifier.

* * * * *